Nov. 17, 1953     L. D. COBB     2,659,617
DEMOUNTABLE CLOSURE
Filed March 16, 1950
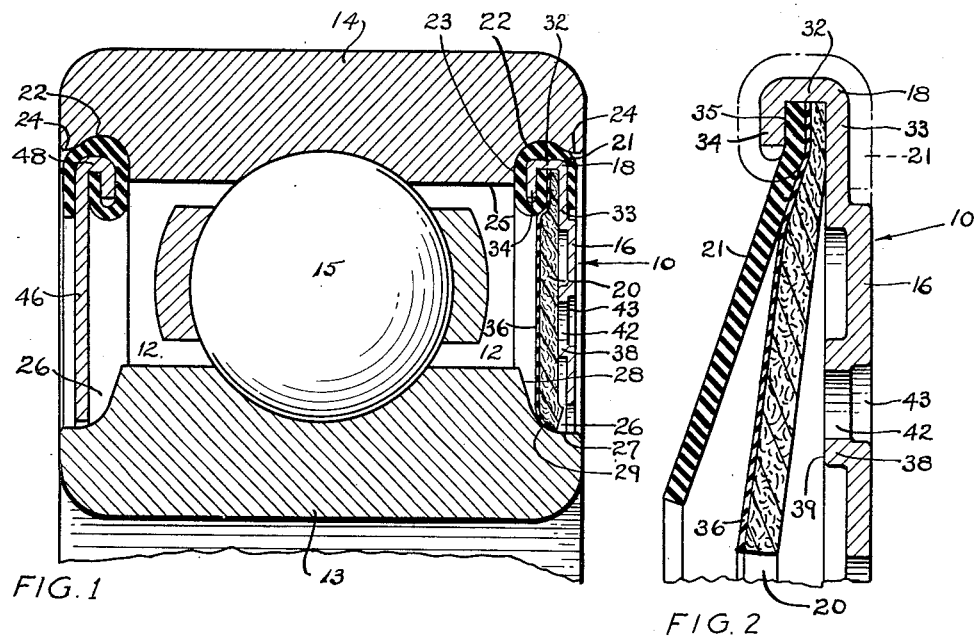
FIG. 1
FIG. 2
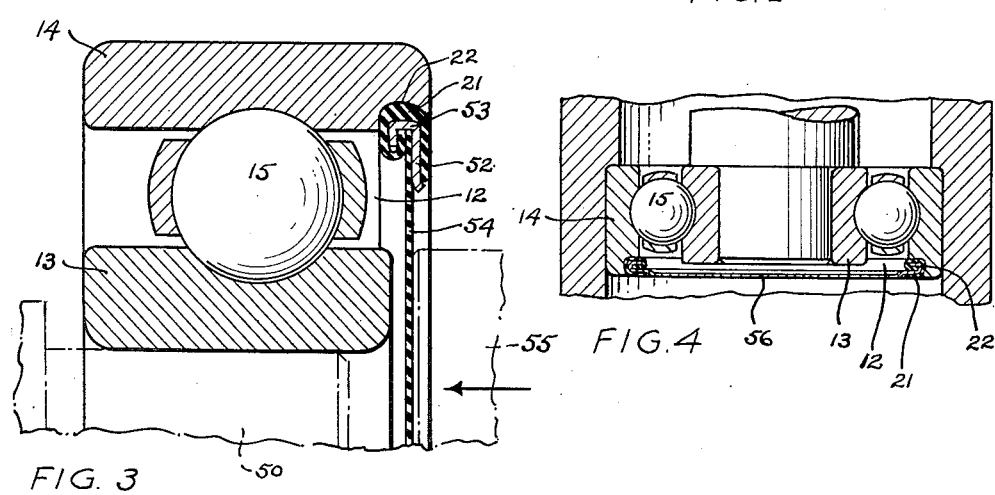
FIG. 3
FIG. 4
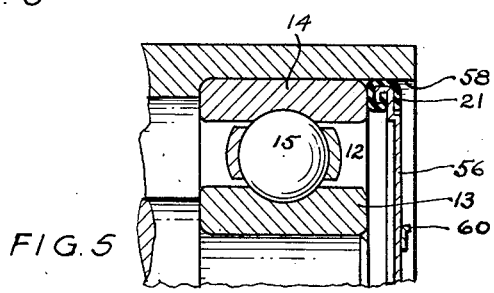
FIG. 5
INVENTOR;
LELAND D. COBB.
BY Romeyn A. Spare
HIS ATTORNEY.

Patented Nov. 17, 1953

2,659,617

UNITED STATES PATENT OFFICE 2,659,617

DEMOUNTABLE CLOSURE

Leland D. Cobb, Forestville, Conn., assignor to General Motors Corporation, Detroit, Mich., a corporation of Delaware Application March 16, 1950, Serial No. 149,949

14 Claims. (Cl. 286—11)

This invention relates to demountable closures for closing the space between two relatively rotatable members and particularly to an easily demountable seal that will prevent lubricant leakage from an antifriction bearing and which will also prevent the ingress of dirt and other deleterious materials into the bearing.

It is important that the race rings of an antifriction bearing should be very accurately finished as well as precisely round and concentric with each other in the assembled bearing. It has been the usual practice to permanently install a seal in the end of the annular lubricant chamber between antifriction bearing race rings by expanding the rim of a metal shield into permanently locked sealing engagement against a grooved portion of one of the race rings and to secure to this shield a sealing washer which extends into wiping engagement with the other race ring. This expanded shield rim often produces in one of the race rings an objectionable out of round condition causing an improper fit of the bearing in its mount. When an antifriction bearing is operated at high temperatures and/or is subjected to overload for extended periods, the lubricant gradually oxidizes to a tarlike consistency and should be removed and replaced. However, these permanently installed seals prevent access to the lubricant chamber since they cannot be removed without damage and frequently removal of these seals also damages the bearings.

It is an object of this invention to provide an improved seal of simple construction which may be easily and repeatedly removed and replaced in sealing position between a pair of relatively rotatable members without damage to the seal or to the rotatable members.

Another object is to provide from sheet materials an improved seal which may be quickly and easily demountably installed as a unit in sealing position at the end of a lubricant chamber between the race rings of a bearing.

Another object is to provide for the end of an antifriction bearing an improved easily demountable seal which may be resiliently deformed to facilitate mounting and demounting of the seal.

A further object is to provide an improved easily demountable unit-handling seal which will effectively maintain a sealing relation between a pair of relatively rotated race rings even under conditions of misalignment.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a cross sectional view of a portion of an antifriction bearing illustrating two related forms of sealing devices;

Figure 2 is an enlarged fragmentary cross section showing the right hand sealing assembly of Figure 1 before it is mounted in the bearing;

Figure 3 shows another form of my sealing device provided with a flexible diaphragm;

Figure 4 shows another form of my sealing device mounted in the end of a bearing and Figure 5 shows a sealing device similar to that of Figure 4 and mounted adjacent to the end of a bearing.

Generally considered, my sealing device as 10, serves as an easily demountable closure for the end of an annular lubricant chamber 12 between relatively rotatable members, as antifriction bearing inner and outer race rings 13 and 14 provided with the usual raceways that receive rolling elements, as balls 15, guided by a cage. A circular shield, as 16, extending across the lubricant chamber, has a folded over peripheral rim, as 18, gripping a sealing washer, as 20, that wipingly seals against the other race ring. This folded-over rim also grips an annular sealing member, as 21, of resilient sheet material stretched over the rim and yieldably compressed in sealing relation between this rim and a surface of revolution on one of the relatively rotatable members to demountably secure the sealing assembly in position.

In Figure 1, each end of the outer race ring 14 has an annular seal-receiving groove 22 which is transversely curved between an annular shoulder 23 and an annular land 24 having a diameter intermediate between the diameter of the bottom of this groove and that of an inner cylindrical wall 25 on this race ring. Each end of the inner race ring 13 has an annular notch 26 and is provided with a generally cylindrical surface 27 and an annular, preferably frusto-conical, side face 28, this side face and the cylindrical surface blending with an intermediate transversely curved surface 29.

In the sealing device at the right hand side of Figure 1 and in Figure 2, the shield 16, which may be formed from sheet metal and which extends across the lubricant chamber into closely spaced relation with the surface 27, has its periphery folded back into spaced relation with the shield body forming a cylindrical wall 32 extending between an annular offset portion 33 and an annular flange 34 providing an annular seal-holding groove 35. The cylindrical wall 32 is of slightly less diameter than that of the land 24. The peripheral portions of the sealing washer 20 and of the resilient annular seal 21, which preferably bottom in the groove 35, are deformably gripped between the bent-over flange 34 and the offset portion 33 causing the sealing washer 20 and the annular sealing member 21 to initially spring outwardly from the shield body as shown in Figure 2. The sealing washer 20 may be composed of a yieldably resilient lubricant sealing material such as felt, cork, synthetic rubber or other suitable sealing materials. The illustrated washer 20 is composed of a tightly woven felt having closely intermingled fibers which prevent lubricant leakage through the sealing washer.

The sealing washer is preferably provided on its side facing the lubricant chamber with a thin adhering coating or sheet 36 of a flexible lubricant-impervious material which is preferably composed of a polyamide resin that is a reaction product of a dicarboxylic acid and a diamine and commonly referred to as "nylon" and which has a very low coefficient of friction when in relatively rotatable engagement with a lubricated race ring surface. Other synthetic materials having the desired characteristics may alternatively be used for the coating 36. The annular sealing member 21 is folded back from its full line position of Figure 2 and is resiliently stretched over the rim 18, the outer portion of this sealing member 21 being gripped between the sealing washer 20 and the flange 34. The thickness of the resilient sealing member 21 when uncompressed slightly exceeds the radial width between the cylindrical wall 32 and the bottom of the groove 22. During installation, succeeding portions of the seal assembly periphery are progressively pressed into the groove 22 and the sealing member 21 resiliently compresses sufficiently between the rim 18 and the land 24 to permit the seal assembly to be easily snapped past this land 24. When mounted, the sealing member 21 is resiliently compressed sufficiently between the rim 18 and the walls of the groove 22 to firmly but demountably secure the seal assembly in unit-handling relation with the bearing and to prevent lubricant leakage between the shield 16 and the outer race ring 14. The seal assembly is easily demounted without damage by gripping an outer exposed portion of the resilient member 21 and stretching it outwardly from the bearing sufficiently to snap the seal assembly past the land 24 and out of the groove 22. If preferred, a screw driver or other tool may be used against the shield to snap the seal assembly out of the groove 22. The sealing member 21 may be composed of various rubber-like materials which will not deteriorate or materially change resiliency in the presence of heat, light, and lubricant; one satisfactory material being a resilient vulcanized synthetic rubber containing a polymerization product of butadiene and acrylic nitrile. The bore diameter of the sealing washer 20 is such that the inner edge of this washer will slightly curl and yieldably present the coating 36 in lightly wiping sealing contact with the side wall 28, 29 and preferably just out of contact with the cylindrical wall 27 so that the sealing washer 20 will maintain an effective sealing relation against the side wall of the notch 26 even in the event of misalignment of the race rings.

The shield 16 has intermediate its radial width an annularly extending dished portion 38 provided with a sealing washer engaging face 39 which aids in locating the sealing washer in sealing position. One or more conveniently located holes 42, extending through the dished portion open at their inner ends onto the sealing washer 20 and open at their outer ends into an annular groove 43. When it is desired to add lubricant while the seal is mounted, a small hollow needle on a lubricant pressure gun (not shown) is entered through one of the holes 42, pierced through the sealing washer, and lubricant is forced through the needle into the bearing. As the needle is withdrawn, the inherent resiliency of the sealing washer 20 causes the temporary needle-pierced hole to close. The groove 43 aids in guiding the needle to the hole 42.

The closure at the left side of Figure 1 has an annular shield 46 generally similar to the shield 16 and extending across the lubricant chamber 12 into closely spaced relation with the bottom of the annular race ring notch 26. The periphery of the shield 46 has a folded-over rim 48 similar to the rim 18 and gripping a resilient sealing member 21 that is stretched back over the rim and which demountably secures the shield 46 in the outer race ring groove 22 in the same manner as previously described with reference to the right hand seal assembly of Figure 1.

In the embodiment of Figure 3, one end of the outer race ring 14 extends beyond the inner race ring 13 which is arranged to be pressed over a reduced shaft end 50 and against a shaft shoulder, the reduced shaft end preferably being no longer than the inner race ring. An annular metal shield 52, generally similar to the shield 46 and having a central bore diameter exceeding the diameter of the inner race ring 13, has a folded over peripheral rim 53 similar to the rim 18 and gripping a resilient rubber-like diaphragm 54 and also gripping a resilient sealing member 21 that is stretched back over the rim and demountably seated in the outer race ring groove 22 to mount the seal assembly in the same manner as shown in Figure 1. The diaphragm 54 normally extends across the lubricant chamber and across the end of the inner race ring in spaced relation to the inner race ring. A shaft or ram 55 is temporarily pressed against and deflects the diaphragm 54 into inner race ring engagement and forces this race ring onto the reduced shaft portion 50 against the shaft shoulder.

In the embodiment of Figure 4, one end of the outer race ring 14 extends beyond the inner race ring 13 and a closure disc or shield 56, which may be of sheet metal, extends across the end of the bearing in spaced relation to the inner race ring and has a folded over peripheral rim gripping a resilient sealing member 21 demountably seated in a groove 22 in the same manner as described for Figure 1.

In the embodiment of Figure 5, the closure disc 56 of Figure 4 and its rim-gripped resilient sealing member 21 are shown demountably pressed into the bore 58 of a housing to close an end of the bearing. The resilient sealing member 21 is compressed against the bore 58. A lug 60 projecting from the disc 56 may be gripped by a pair of pliers to facilitate seal removal.

I claim:

1. In a closure for demountably positioning across an annular lubricant chamber between a pair of relatively rotatable members one of which has a surface of revolution facing towards the other member, a circular shield extending alongside the lubricant chamber and having a rim, the rim being laterally folded back towards the body of the shield, and a sheet of resilient sealing material gripped by the rim and laterally folded back over the periphery of the rim and demountably seated in compressed engagement against said surface of revolution.

2. In a closure for demountably positioning across an annular lubricant chamber between a pair of relatively rotatable members one of which has a surface of revolution facing towards the other member, a circular shield extending alongside the lubricant chamber, a rim on the shield, the rim being laterally folded back towards the body of the shield and providing an annular groove opening away from said surface of revolution, and an annular sheet of resilient sealing material peripherally secured within said groove and laterally folded back over the periphery of the rim and compressed in demountably seated engagement between the rim and said surface of revolution.

3. In a demountable closure for closing an end of an annular lubricant chamber between a pair of relatively rotatable inner and outer annular members, the outer member having an annular groove opening towards the inner member, a circular shield extending alongside the lubricant chamber, a laterally folded-over rim on the shield, an annular flange on the rim and spaced from the body of the shield, an annular sheet of resilient material gripped adjacent its periphery by said flange and folded back over the periphery of said rim, and said annular sheet being demountably secured in resilient compression between a wall of the groove and said rim.

4. In a demountable closure for closing an end of an annular lubricant chamber between a pair of relatively rotatable inner and outer annular members, the outer member having an annular groove opening towards the inner member, a circular shield extending alongside the lubricant chamber, a laterally folded-over rim on the shield, an annular flange on the rim and spaced from the shield body, an annular sheet of resilient synthetic rubber gripped adjacent its periphery by said flange, the synthetic rubber sheet being laterally folded back over and resiliently stretched around said rim, and said sheet being resiliently compressed between the rim and the walls of said groove to removably hold the closure in operative position.

5. In a demountable closure for closing an end of an annular lubricant chamber between a pair of relatively rotatable inner and outer annular members, the outer member having an annular groove opening towards the inner member and having an annular land at one side of said groove, a circular shield extending alongside the lubricant chamber, a laterally folded over shield rim having an annular land at one side of said groove, lar land, an annular sheet of resilient material peripherally gripped by the rim and stretched back over the periphery of said rim, and the rim-surrounding portion of said resilient sheet having such an outer diameter that the closure may be demountably snapped past the land into and out of resiliently seated relation in the outer member groove.

6. In a demountable closure for closing an end of an annular lubricant chamber between a pair of relatively rotatable inner and outer annular members, the outer member having an annular groove opening towards the inner member and having an annular land at one side of said groove, a circular shield extending alongside the lubricant chamber, a laterally folded-over shield rim having a diameter less than that of the annular land, the shield rim having an annular groove opening towards said inner member, an annular sheet of resilient material gripped by the rim within its groove and laterally stretched over the periphery of the rim, and the rim-surrounding portion of the resilient sheet having an outer diameter such that it may be yieldably snapped past the land into and out of compressibly seated relation in said outer member groove.

7. In a closure for demountably positioning across an annular lubricant chamber between a pair of relatively rotatable members, one of said members being provided with a surface of revolution facing toward the other member, a circular shield extending alongside the lubricant chamber, a shield rim laterally folded back into spaced relation with the body of the shield, a flexible sealing washer peripherally gripped by the rim and laterally extending into sealing engagement with said other member, an annular sheet of resilient material gripped by the sealing washer and by said rim, and said annular sheet being stretched over the rim and demountably seated in resilient compression against said surface of revolution.

8. In a demountable closure for positioning across an annular lubricant chamber between a pair of relatively rotatable members, one of said members being provided with a surface of revolution facing towards the other member, a circular shield extending alongside the lubricant chamber, a laterally folded-over rim on the shield having an annular flange spaced from the body of the shield, a sealing washer peripherally gripped between the flange and the shield body and sprung by said rim laterally away from the shield into sealing engagement with said other member, and an annular sheet of resilient material peripherally gripped by the rim and by the sealing washer and stretched back over said rim and demountably compressed between the rim periphery and said surface of revolution.

9. In a demountable closure for positioning across an annular lubricant chamber between a pair of relatively rotatable members one of which has an annular notch, said other member having an annular groove opening towards said notch, a circular shield extending across the lubricant chamber into the notch and spaced from the bottom of the notch, a shield rim laterally folded back into spaced relation with the body of the shield, a flexible sealing washer peripherally received within the rim and extending across the lubricant chamber into sealing engagement with a wall of said notch, an annular sheet of rubberlike material peripherally received within the rim against the sealing washer and laterally folded back into resilient engagement with the rim, the adjacent peripheral portions of said sealing washer and of said sheet being tightly gripped together by said rim in unit-handling relation with the shield, and said annular sheet being demountably and compressibly seated within said groove.

10. In a demountable closure for the end of an annular lubricant chamber between a pair of relatively rotatable inner and outer members, the outer member having a surface of revolution facing radially inwardly, a circular shield extending alongside the lubricant chamber, a shield rim laterally folded back into spaced relation with the body of the shield and having an annular groove opening towards the inner member, a circular flexible sealing member peripherally gripped by the rim in its groove and extending across the lubricant chamber, and an annular sheet of resilient material received in the rim groove and peripherally gripped against the sealing member by the rim and folded back and stretched over the periphery of said rim, said annular sheet being resiliently compressed between the rim periphery and said surface of revolution and demountably securing the seal to said outer member.

11. In a demountable closure for positioning across an annular lubricant chamber between a pair of relatively rotatable members one of which has a surface of revolution facing radially inwardly, an annular shield extending alongside the lubricant chamber, a shield rim laterally folded back into spaced relation with the body portion of the shield, a circular flexible diaphragm peripherally gripped by the rim and extending past the end of said other member and normally spaced from said other member, the diaphragm being deformable into engagement with said other member, and an annular sheet of resilient material peripherally gripped by the diaphragm and by the rim, said annular sheet being stretched over said rim and demountably compressed between the rim and said surface of revolution.

12. In a demountable closure for positioning across an annular lubricant chamber between a pair of relatively rotatable members one of which has a surface of revolution facing towards the other member, a circular shield extending alongside the lubricant chamber, a shield rim laterally folded back towards the body of the shield and having an annular flange spaced from the shield body, a flexible sealing washer peripherally gripped by said rim and extending across the lubricant chamber, a lubricant impervious coating on the sealing washer and extending into sealing engagement with said other member, and an annular sheet of resilient material peripherally gripped by the flange and by the sealing washer, said sheet being stretched over said rim and demountably compressed between the rim and said surface of revolution.

13. In a demountable closure for positioning across an annular lubricant chamber between a pair of relatively rotatable members, one of said members having an annular notch and the other member having an annular groove radially opening towards said notch, a circular shield extending alongside the lubricant chamber, a rim on the shield, the rim being laterally folded back towards the body of the shield and providing an annular groove opening towards the notch, a sealing washer peripherally received in the rim groove and extending across the lubricant chamber, a lubricant impervious coating on the sealing washer and sealingly engaging a wall of the notch, an annular sheet of resilient material peripherally received in the rim groove and stretched around the rim, said rim gripping against the sealing washer and said sheet and holding the sealing washer and sheet in unit-handling relation with the shield, and said annular sheet being demountably compressed between the rim and the walls of said outer member groove.

14. In a demountable closure for positioning across an annular lubricant chamber between a pair of relatively rotatable members, one of said members having an annular notch and the other member having an annular groove opening towards said notch, a circular shield extending alongside the lubricant chamber, a laterally folded-over shield rim having an annular flange spaced from the body of the shield, a flexible sealing washer of closely intermingled fibers and extending across the lubricant chamber, an annular sheet of resilient rubber-like material, the peripheral portions of the sealing washer and of the annular sheet being clamped together between the annular flange and the shield body, a flexible coating of a polyamide resin secured to the side of the sealing washer facing the lubricant chamber and in sealing engagement with said other relatively rotatable member, and the annular rubber-like sheet being laterally stretched around the rim and resiliently and demountably seated against the walls of said groove.

LELAND D. COBB.

References Cited in the file of this patent

UNITED STATES PATENTS

| Number | Name | Date |
|---|---|---|
| 734,140 | Schram | July 21, 1903 |
| 1,916,857 | Copeman | July 4, 1933 |
| 1,917,988 | Large | July 11, 1933 |
| 2,031,618 | Robins | May 28, 1940 |
| 2,202,770 | Brodin | May 28, 1940 |
| 2,251,012 | Delaval-Crow | July 29, 1941 |
| 2,252,554 | Carothers | Aug. 12, 1941 |
| 2,294,105 | Wallgren | Aug. 25, 1942 |
| 2,352,784 | Geyer | July 4, 1944 |
| 2,467,049 | Peterson | Apr. 12, 1949 |

OTHER REFERENCES

"Plain and Laminated Felt Seals, Their Design and Application" from Product Engineering of March 1946. (Copy in 286–5.)

"Molded and Machined Nylon" from Product Engineering of December 1946. (Copy in 288–S. R.)